United States Patent
Woodell

(10) Patent No.: US 7,616,150 B1
(45) Date of Patent: Nov. 10, 2009

(54) NULL STEERING SYSTEM AND METHOD FOR TERRAIN ESTIMATION

(75) Inventor: Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/863,219

(22) Filed: Sep. 27, 2007

(51) Int. Cl.
*G01S 13/94* (2006.01)
*G01S 13/08* (2006.01)
*G01S 13/95* (2006.01)
*G01S 13/00* (2006.01)

(52) U.S. Cl. .................. 342/120; 342/26 R; 342/26 B; 342/61; 342/63; 342/65; 342/118; 342/175; 342/195

(58) Field of Classification Search ...... 342/26 R–26 D, 342/59, 61–65, 73–81, 118, 120–123, 165–175, 342/192–197; 701/1, 3; 702/1, 2, 5
See application file for complete search history.

(56) References Cited

U.S. PATENT DOCUMENTS

| | | | |
|---|---|---|---|
| 3,113,310 A * | 12/1963 | Standing | ..................... 342/123 |
| 4,953,972 A * | 9/1990 | Zuk | ............................ 342/123 |
| 6,023,240 A | 2/2000 | Sutton | |
| 6,064,942 A | 5/2000 | Johnson et al. | |
| 6,128,553 A | 10/2000 | Gordon et al. | |
| 6,150,901 A | 11/2000 | Auken | |
| 6,154,151 A | 11/2000 | McElreath et al. | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,194,980 B1 | 2/2001 | Thon | |
| 6,201,494 B1 | 3/2001 | Kronfeld | |
| 6,204,806 B1 | 3/2001 | Hoech | |
| 6,259,400 B1 | 7/2001 | Higgins et al. | |
| 6,266,114 B1 | 7/2001 | Skarohlid | |
| 6,281,832 B1 | 8/2001 | McElreath | |
| 6,285,298 B1 | 9/2001 | Gordon | |
| 6,285,337 B1 | 9/2001 | West et al. | |
| 6,285,926 B1 | 9/2001 | Weiler et al. | |
| 6,317,872 B1 | 11/2001 | Gee et al. | |
| 6,345,127 B1 | 2/2002 | Mitchell | |
| 6,359,585 B1 | 3/2002 | Bechman et al. | |
| 6,373,418 B1 | 4/2002 | Abbey | |
| 6,374,286 B1 | 4/2002 | Gee et al. | |
| 6,377,892 B1 | 4/2002 | Johnson et al. | |
| 6,388,607 B1 | 5/2002 | Woodell | |
| 6,388,608 B1 | 5/2002 | Woodell et al. | |

(Continued)

OTHER PUBLICATIONS

U.S. Appl. No. 11/900,002, filed Sep. 6, 2007, Woodell et al.

(Continued)

*Primary Examiner*—Bernarr E Gregory
(74) *Attorney, Agent, or Firm*—Daniel M. Barbieri

(57) ABSTRACT

A weather radar system coupled to a weather radar antenna, including a receive circuit for receiving radar returns received by the antenna and a processor for summing portions of the radar return data to obtain a null response. The processor adjusts the phase or power of at least one portion of the radar return data using a steering vector or a tuning vector.

20 Claims, 11 Drawing Sheets

U.S. PATENT DOCUMENTS

| | | |
|---|---|---|
| 6,421,000 B1 | 7/2002 | McDowell |
| 6,424,288 B1 | 7/2002 | Woodell |
| 6,426,717 B1 | 7/2002 | Maloratsky |
| 6,441,773 B1 | 8/2002 | Kelly et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,473,240 B1 | 10/2002 | Dehmlow |
| 6,492,934 B1 | 12/2002 | Hwang et al. |
| 6,512,476 B1 | 1/2003 | Woodell |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | DeWulf |
| 6,603,425 B1 | 8/2003 | Woodell |
| 6,650,275 B1 | 11/2003 | Kelly et al. |
| 6,650,291 B1 | 11/2003 | West et al. |
| 6,690,298 B1 | 2/2004 | Barber et al. |
| 6,690,299 B1 | 2/2004 | Suiter |
| 6,697,008 B1 | 2/2004 | Sternowski |
| 6,710,663 B1 | 3/2004 | Berquist |
| 6,714,186 B1 | 3/2004 | Mosier et al. |
| 6,724,344 B1 | 4/2004 | Stockmaster et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,771,626 B1 | 8/2004 | Golubiewski et al. |
| 6,782,392 B1 | 8/2004 | Weinberger et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,839,017 B1 | 1/2005 | Dillman |
| 6,850,185 B1 | 2/2005 | Woodell |
| 6,862,323 B1 | 3/2005 | Loper |
| 6,879,280 B1 | 4/2005 | Bull et al. |
| 6,882,302 B1 | 4/2005 | Woodell et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,995,726 B1 | 2/2006 | West et al. |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,028,304 B1 | 4/2006 | Weinberger et al. |
| 7,034,753 B1 | 4/2006 | Elsallal et al. |
| 7,069,120 B1 | 6/2006 | Koenck et al. |
| 7,089,092 B1 | 8/2006 | Wood et al. |
| 7,092,645 B1 | 8/2006 | Sternowski |
| 7,109,912 B1 | 9/2006 | Paramore et al. |
| 7,109,913 B1 | 9/2006 | Paramore et al. |
| 7,129,885 B1 | 10/2006 | Woodell et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,196,329 B1 | 3/2007 | Wood et al. |
| 7,205,933 B1 | 4/2007 | Snodgrass |
| 7,219,011 B1 | 5/2007 | Barber |
| 7,242,343 B1 | 7/2007 | Woodell |
| 7,250,903 B1 | 7/2007 | McDowell |
| 7,269,657 B1 | 9/2007 | Alexander et al. |
| 7,272,472 B1 | 9/2007 | McElreath |
| 7,292,178 B1 | 11/2007 | Woodell et al. |

OTHER PUBLICATIONS

U.S. Appl. No. 11/899,801, filed Sep. 6, 2007, Woodell et al.
U.S. Appl. No. 11/851,323, filed Sep. 6, 2007, McCusker.
U.S. Appl. No. 11/863,215, filed Sep. 27, 2007, Woodell.
U.S. Appl. No. 11/863,221, filed Sep. 27, 2007, Woodell.
Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

* cited by examiner

NULL STEERING SYSTEM AND METHOD FOR TERRAIN ESTIMATION

CROSS-REFERENCE TO RELATED APPLICATIONS

This application is related to U.S. application Ser. No. 11/900,002 entitled "SYSTEM AND METHOD FOR A TERRAIN DATABASE AND/OR POSITION VALIDATION" filed on Sep. 6, 2007 by Woodell et al., U.S. application Ser. No. 11/899,801 entitled "TERRAIN AVOIDANCE SYSTEM AND METHOD USING WEATHER RADAR FOR TERRAIN DATABASE GENERATION" filed on Sep. 6, 2007 by Woodell et al., and U.S. application Ser. No. 11/851,323, entitled "METHOD FOR SENSOR-BASED TERRAIN AVOIDANCE" filed on Sep. 6, 2007 by McCusker, U.S. patent application Ser. No. 11/863,215, entitled "METHOD AND APPARATUS FOR ESTIMATING TERRAIN ELEVATION USING A NULL RESPONSE", filed on an even date herewith by Woodell, and U.S. patent application Ser. No. 11/863,221, entitled "HALF APERTURE ANTENNA RESOLUTION SYSTEM AND METHOD", filed on an even date herewith by Woodell, all assigned to the Assignee of this patent application and incorporated herein by reference. all assigned to the Assignee of this patent application and incorporated herein by reference.

BACKGROUND

The present disclosure relates generally to the field of terrain estimation. The present disclosure relates more specifically to the field of terrain elevation estimation in an aircraft.

Conventionally, pilots use terrain warning systems such as terrain awareness and warning systems (TAWS), ground proximity warning systems (GPWS), and enhanced GPWS (EGPWS). Terrain warning systems have been designed to provide critical information to pilots and flight crews to reduce aviation accidents related to controlled flight into terrain. Certain conventional terrain awareness systems and methods sense terrain height using a radar, such as a radar-based TAS (RTAS). Accurately sensing terrain elevation using radar can be particularly difficult. For example, vertical swept radar solutions suffer from beam shape effects and contamination from weather returns. Contamination from weather returns is particularly problematic during period of moderate to heavy precipitation.

Therefore, there is a need for a system and method for a more accurate terrain elevation estimation. There is also a need for a system and method to more accurately estimate terrain elevation during precipitation. Further, there is a need for a more accurate radar-based terrain sensor. Further still, there is a need for a low cost radar-based terrain sensor that does not require additional hardware. Yet further, there is a need for a terrain sensor that is less susceptible to noise issues and beam shape effects.

SUMMARY

One embodiment of the present invention relates to a method of sensing terrain elevation using an airborne weather radar. The method samples a first portion of an antenna and a second portion of an antenna. The method adjusts the phase or power of at least one of the portions of the radar returns and combine them to provide a null pattern.

Another embodiment of the present invention relates to a weather radar system coupled to a weather radar antenna. The weather radar system includes a receive circuit for receiving radar returns received by the weather radar antenna and provides radar return data for a processor that is coupled to the weather radar system. The processor receives the radar return data from the receive circuit. The processor adjusts the phase or the power of at least one portion of the radar return data using a steering vector or a tuning vector. The processor sums portions of the radar return data to obtain a null response.

Yet another embodiment of the present invention relates to an apparatus for sensing terrain height. The apparatus contains means for sampling weather radar return data associated with a scan and providing a first portion of the radar return data and a second portion of the radar return data. The apparatus includes means for providing a null response in response to the first portion and the second portion. The null response is provided by summing the first portion with the second portion after the first portion or the second portion have been adjusted in phase or power.

DETAILED DESCRIPTION OF THE EXEMPLARY EMBODIMENTS

Although the description below contains specific embodiments, these embodiments are utilized to illustrate only some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Figure 1:
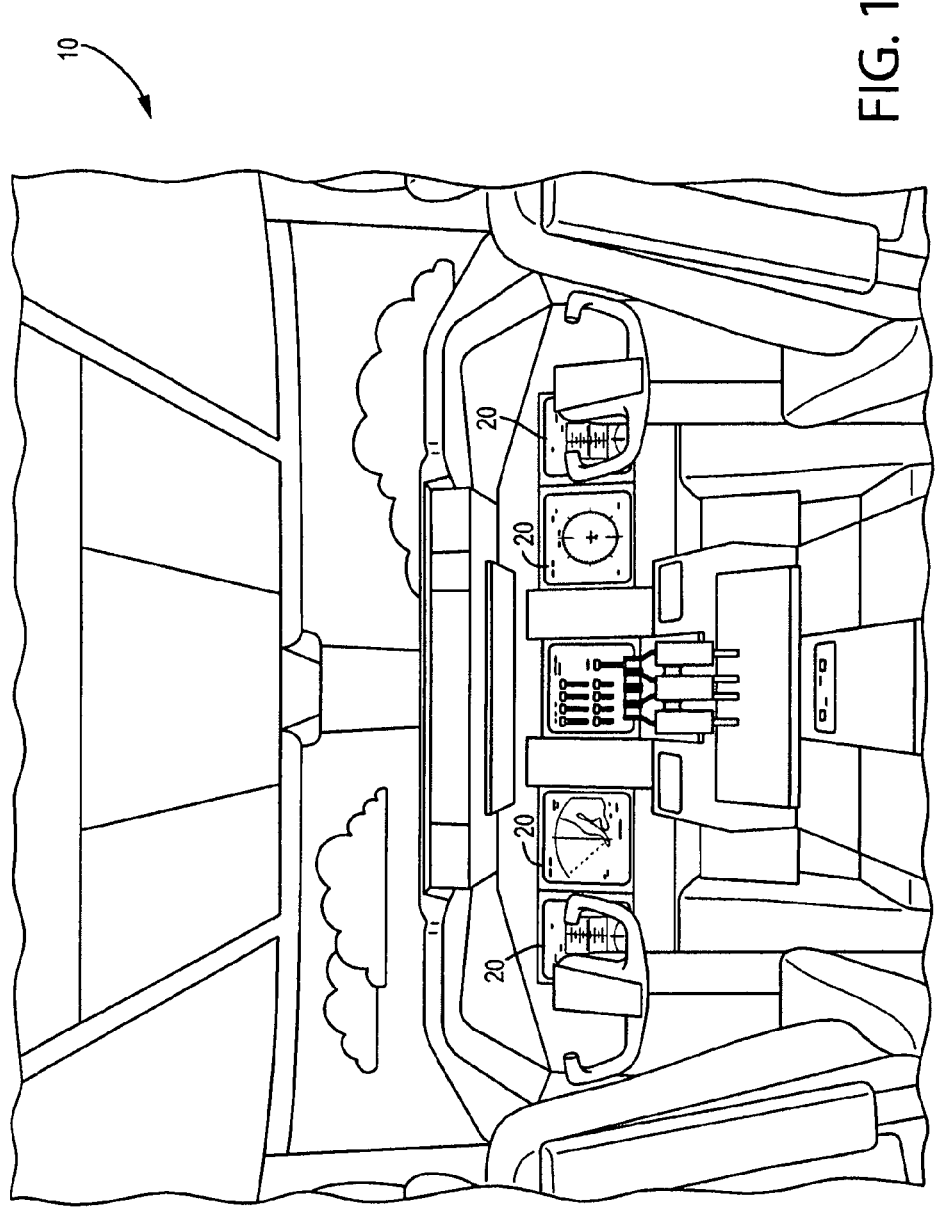
FIG. 1 is an illustration of an aircraft control center, according to one exemplary embodiment.

Referring to FIG. 1, an illustration of an aircraft control center or cockpit 10 is shown, according to one exemplary embodiment. Aircraft control center 10 includes flight displays 20. The pilot may use flight displays 20 to increase visual range and to enhance decision-making abilities. In an exemplary embodiment, flight displays 20 may be configured to show weather, terrain, fixed obstacles, variable obstacles (e.g., other aircraft), flight characteristics (e.g., altitude or speed), or any combination thereof.

Figure 2:
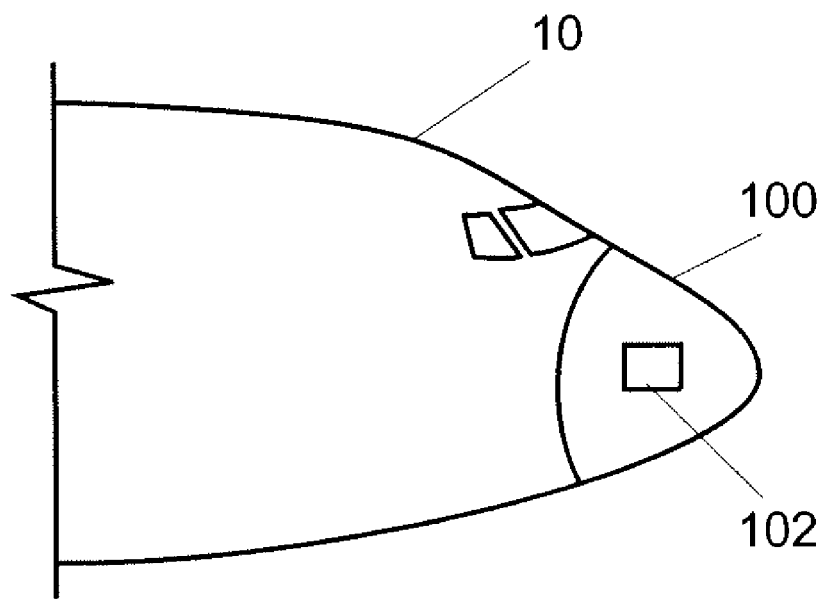
FIG. 2 is an illustration view of the nose of an aircraft including the aircraft control center of FIG. 1, according to an exemplary embodiment.

In FIG. 2, the front of an aircraft is shown with aircraft control center 10 and nose 100, according to an exemplary embodiment. A radar system 102 is generally located inside the nose 100 of the aircraft. According to other exemplary embodiments, radar system 102 may be located on the top of the aircraft or on the tail of the aircraft. In an exemplary embodiment, radar system 102 can be a weather radar system and is adapted to use a null response to determine elevation estimates.

In an exemplary embodiment, the weather radar returns received by the weather radar antenna associated with radar system 102 can be separated into two or more portions. The first portion of the returns can relate to data from one area, while a second portion of the returns can relate to data from a different area. In a preferred embodiment, the first portion of the returns may relate to a first portion of the weather radar antenna, and the second portion of the returns may relate to a second portion of the weather radar antenna. The first portion is preferably exclusive of the second portion and can be combined with the second portion to achieve a null response. In a preferred embodiment, the first portion and the second portion are separated and combined in the receive circuit or processor of radar system 102.

Figure 3:
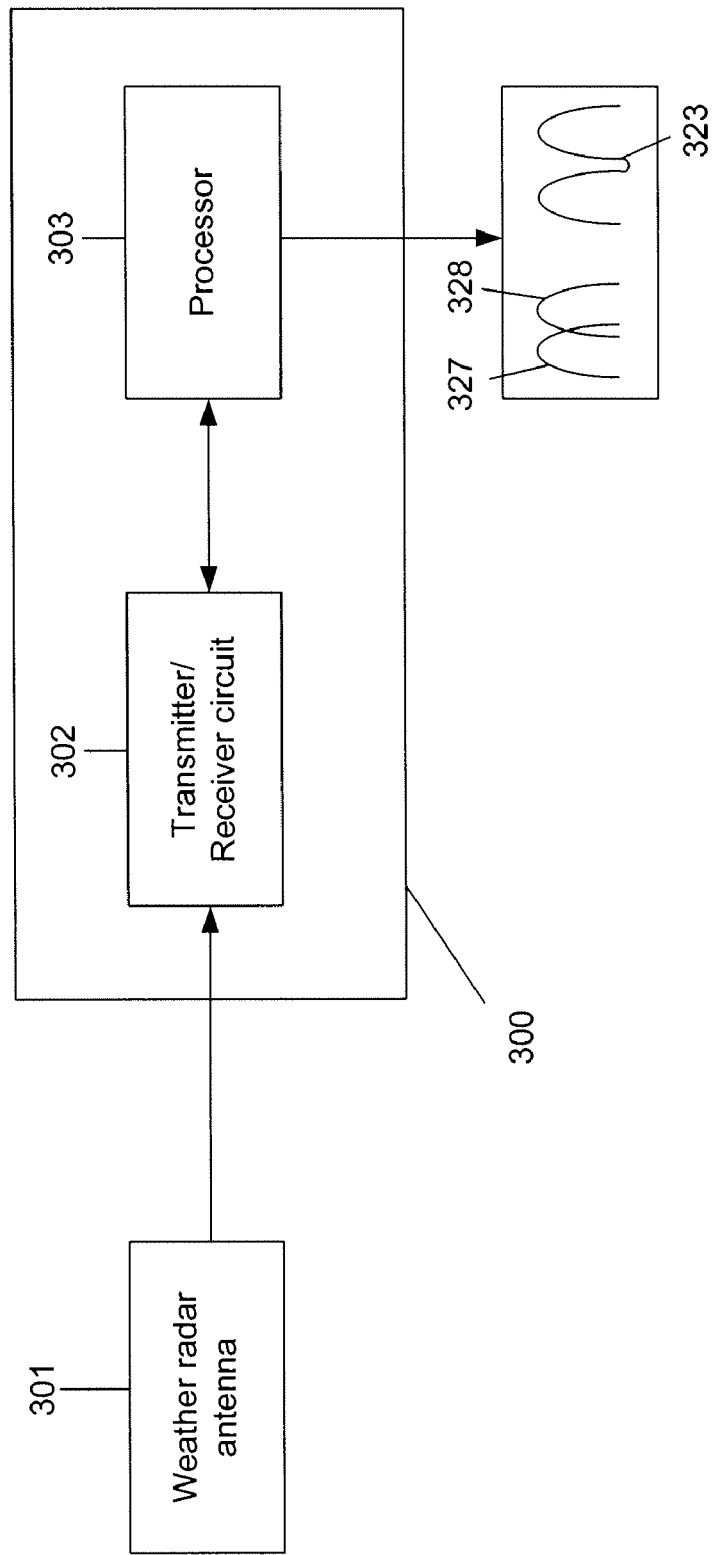
FIG. 3 is a block diagram of a weather radar system, according to an exemplary embodiment.

Referring to FIG. 3, a block diagram of a weather radar system 300 is shown, according to an exemplary embodiment. Weather radar system 300 is an example of a type of radar system 102. Weather radar system 300 is coupled to weather radar antenna 301. Weather radar antenna 301 may scan the terrain and provide radar returns for weather radar system 300. According to one exemplary embodiment, the scan may be a vertical scan or an elevation scan for estimating the terrain elevation at a specific location. Alternatively, the scans may be in one or multiple directions.

Transmitter/receiver circuit 302 may be configured to receive radar returns received by weather radar antenna 301 and is also coupled to processor 303. Transmitter/receiver circuit 302 may provide processor 303 with radar return data to analyze and may alter radar return data in a number of ways. In one embodiment, processor 303 may combine or sum two portions of radar return data that are provided by receive portions of circuit 302. Processor 303 can also alter a representation of the power and/or phase of the weather radar return, according to an exemplary embodiment. Preferably, processor 303 operates to generate null response 323 by combining portions of radar return data. Processor 303 can perform operations to steer and/or tune null response 323 as described below.

In one exemplary embodiment, radar return data may be separated into two portions (e.g. an upper half 327 and a lower half 328 (e.g., sub-aperture beams)). Halves 327 and 328 are adjusted and combined to achieve null response 323. For example, according to an exemplary embodiment, the lower half 328 of radar return data may be taken out of phase by 180 degrees and combined with an upper half 327 to achieve null response 323 (a difference operation). Other exemplary embodiments may separate radar return data differently (e.g. into more than two portions), and alter each portion according to different principles.

The null response is utilized to estimate the elevation of terrain. The radar response while sweeping that antenna is the convolution of the target field, in this cases ground clutter, with the antenna pattern. While sweeping the antenna vertically to obtain the radar response from terrain, the null pattern produces a sharp dip in return power as the null is swept past ground clutter. This narrow dip is much narrower than data produced by a normal sum beam similarly being swept vertically. With weather responses being volume reflectors, the narrow response of the null encompasses a much smaller volume of hydrometeors than encompassed by the sum beam. The relatively small amount of radar power produced from weather reflectors in the null allows the return power dip from ground targets to be seen even when substantial weather return power is seen in the sum beam. Thus, the null response provides a narrower response that allows terrain and/or obstacles to be more easily distinguished from weather responses.

Null response 323 can be created in a variety of ways. In one exemplary embodiment, null response 323 can be created by combining the first portion with an adjusted second portion of radar return data. In another exemplary embodiment, null response 323 can be created by combining the second portion with an adjusted first portion of radar return data. In yet another exemplary embodiment, null response 323 can be created by combining an adjusted first portion with an adjusted second portion of radar return data. In an exemplary embodiment, the adjusted first portion or second portion may be adjusted using a phase delay of 180 degrees or by adjusting amplitude.

In one exemplary embodiment, a radar antenna, such as weather radar antenna 301, can vertically sweep across a terrain and analyze null response 323 to determine elevation estimates. As part of the characteristics of null response 323, power is reduced to a minimum at a location in the middle of the first and second portions of the radar return data. As discussed above, null response 323 preferably has a much narrower bandwidth, allowing for vertical separation of terrain and weather conditions, among other responses.

The sharpening ratio associated with null response 323 may be greater than 5:1, according to an exemplary embodiment. According to another exemplary embodiment, the sharpening ratio may be greater than 10:1. Using null response 323, the resulting data about terrain height and weather conditions can be used by flight displays in the aircraft for pilot/copilot analysis, such as in a terrain awareness system (TAS). Advantageously, system 10 produces a location in the swept beam where the power change (as ground clutter is swept past) is easily identified even when weather is in view.

Figure 4A:
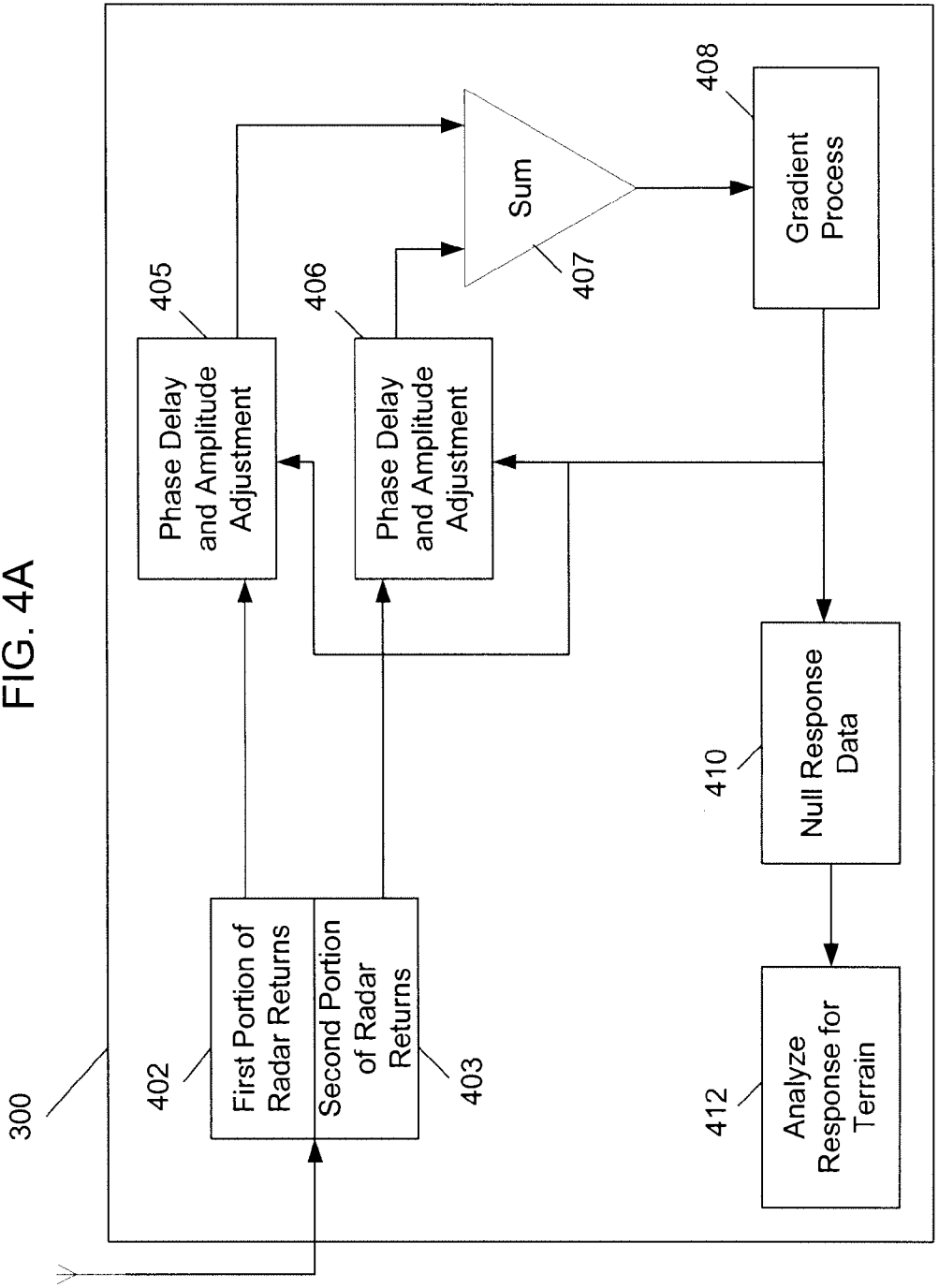
FIG. 4A is a more detailed block diagram of a receiver section of a weather radar system, according to an exemplary embodiment.

Referring to FIG. 4A, a more detailed block diagram of a weather radar system 300 is shown, according to an exemplary embodiment. Weather radar system 300 receives radar returns from weather radar antenna 301. Processor 303 separates the radar returns into a first portion 402 and a second portion 403. Portions 402 and 403 can be stored separately or sequentially. According to an exemplary embodiment, processor 303 separates two different portions of weather radar antenna 301. According to other exemplary embodiments, a receive circuit (e.g. circuit 302) can separate the radar returns into more than two portions.

For each portion that the radar returns may be divided into, a phase delay and amplitude adjuster 405 and 406 is used. According to an exemplary embodiment, a phase delay of approximately 180 degrees may be applied to only one portion of the radar returns. According to another exemplary embodiment, an amplitude adjustment may be used to amplify portions of the radar return to compensate for signal degradations. Adjusters 405 and 406 may use a gradient process 408 to assist in adjusting the radar returns. The altered radar return portions are summed together using a summer 407.

In a preferred embodiment, the gain and phase adjustment of only one sub-channel is required. (Only one signal need be adjusted to produce the null). Gradient process 408 preferably measures the success of producing a null, moves gain and/or phase, and recomputes the success of the null formation process. If successful in improving the null, the change is kept and the local change in gain or phase is recorded along with a score of the null formation process. The local slope of the null formation process verses the gain or phase parameter change is produced. The local slope is used to predict a new value or gain or phase that optimizes the null formation process. Preferably, process 408 receives the current gain and phase adjustment parameters and the derived null formation score.

Process 408 can be implemented according to various techniques: RLS (recursive least square), steepest descent, and others. The gradient optimizer process described above is exemplary in only.

According to an exemplary embodiment, amplitude may be adjusted in a variety of ways. A multitude of functions (e.g. multiplication, division, vector applications, and other mathematical and logic operations) may be used to adjust amplitude. For example, in an exemplary embodiment, a tuning vector can be multiplied to a portion of radar returns to adjust the returns to compensate for variations in sub-aperture beam gains and phases that degrade the performance of the antenna in generating deep nulls with narrow beam widths. These variations may be produced by either errors in gain or phase in the antenna aperture or by variations in radome characteristics. Variations in radome characteristics can require possible gain and phase adjustments to be made during antenna movements.

In another exemplary embodiment, a steering vector can be multiplied to a portion of radar returns to amplify the reading. The steering vector may alter the radar return data such that data received is representative of an antenna null being scanned at an angle different than antenna boresite. For example, radar return data provided by an antenna can be displaced 1.2 degrees from the normal sum beam pointing angle (See FIG. 10). Other angles can be utilized. Preferably, adjusters 405 and 406 and summer 407 are implemented in digital signal process software or other software. Alternatively, hardware may be available to implement adjusters 405 and 406 and summer 407. It should be apparent to those skilled in the art the various software and hardware that may be used to implement these computations. Displacement of formed nulls may be used to hold a target angle region in the null as the antenna is moved. This allows many samples of the nulled data to be processed together and to ensure received radar pulse are collected at all desired angles even when the major transmit/receive cycle may have a low sample rate. This sample rate would cause the radar pulses to skip the narrow formed nulls for some targets.

After summer 407 is applied to the radar return data, the radar return portions can be provided through gradient process 408. Gradient process 408 is utilized to fine tune the adjustments of the portions to form a best case null response 323. Inaccuracies associated with the radar return process can be compensated for by gradient process 408. In one exemplary embodiment terrain elevation data is analyzed with respect to known data heights to adjust the first portion and second portion of radar returns. In another exemplary embodiment, the null response and antenna characteristics are analyzed to determine the appropriate adjustments for null response 323. Null response data 410 and how the data changes with changes in gain/phase adjustment can be used to estimate new gain/phase adjustment values that optimize null formation.

Once the radar return portions are summed, null response data 410 is provided to an analyzer 412. According to an exemplary embodiment, analyzer 412 receives data 410 and determines terrain characteristics (e.g. elevation estimated by using the range) associated with the radar return portions.

Figure 4B:
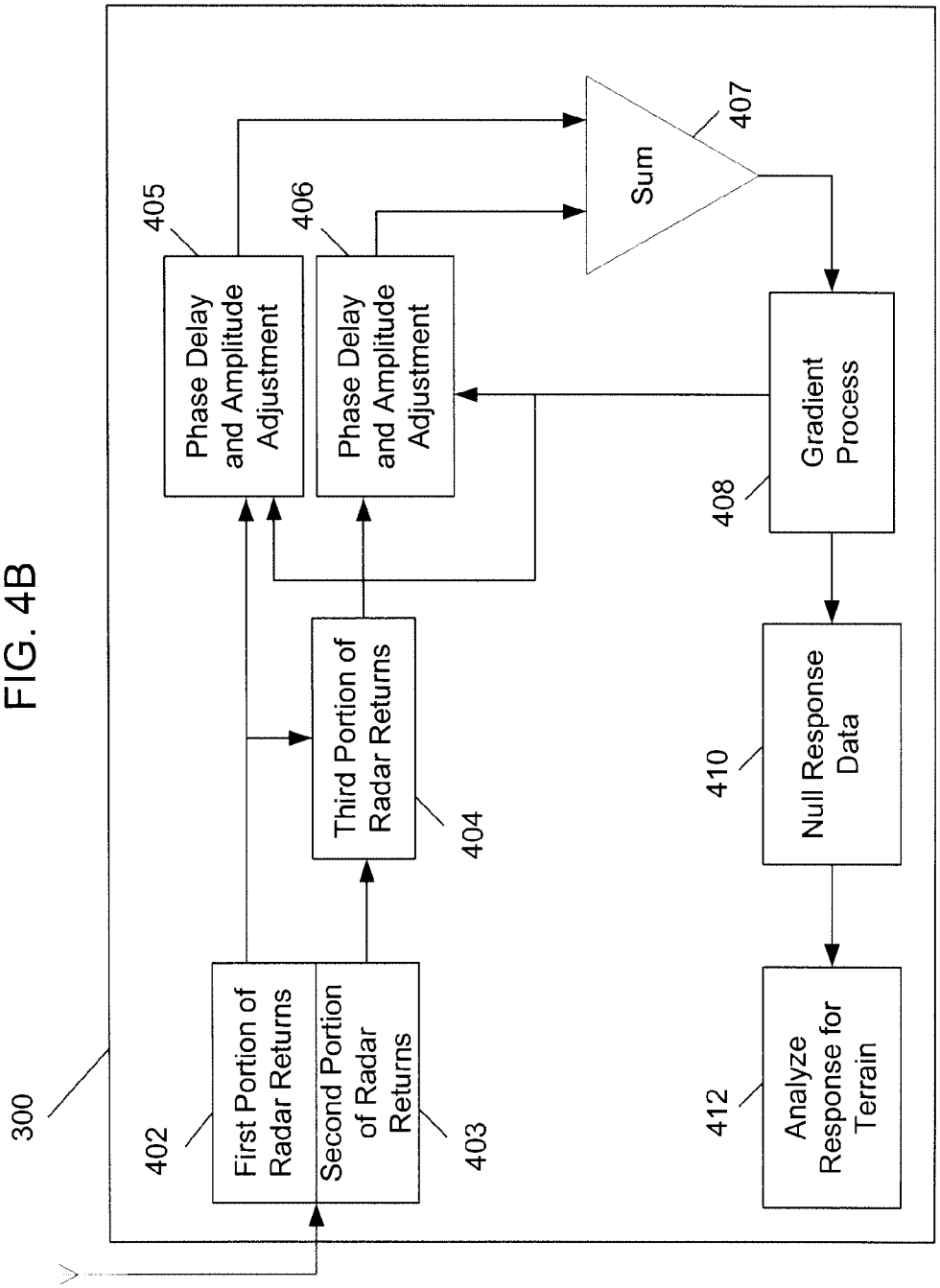
FIG. 4B is a more detailed block diagram of a receiver section of a weather radar system, according to another exemplary embodiment.

Referring to FIG. 4B, a more detailed block diagram of a weather radar system 300 is shown, according to another exemplary embodiment. Weather radar system 300 receives radar returns from weather radar antenna 301. Processor 303 within weather radar system 300 receives the radar returns as a first portion 402 and a second portion 403.

Weather radar antenna 301 may provide various forms of radar return data for processor 303. Second portion 402 includes first portion 403 of radar returns. Using first portion 402 of radar returns and second portion 403 of radar returns, processor 303 may subtract using subtractor 404 first portion 402 of radar returns from second portion 403 of radar returns to determine a third portion of radar returns that represents radar returns not in first portion 402 of radar returns. First portion 402 of radar returns and the third portion of radar returns can have a phase delay and/or amplitude adjustment applied to them and eventually be summed to determine a null response.

In one embodiment, first portion 402 is one half of antenna 301 and second portion 403 is the whole antenna response. In one embodiment, one half of antenna 301 is shorted out via a switch when first portion 402 is collected.

Figure 5:
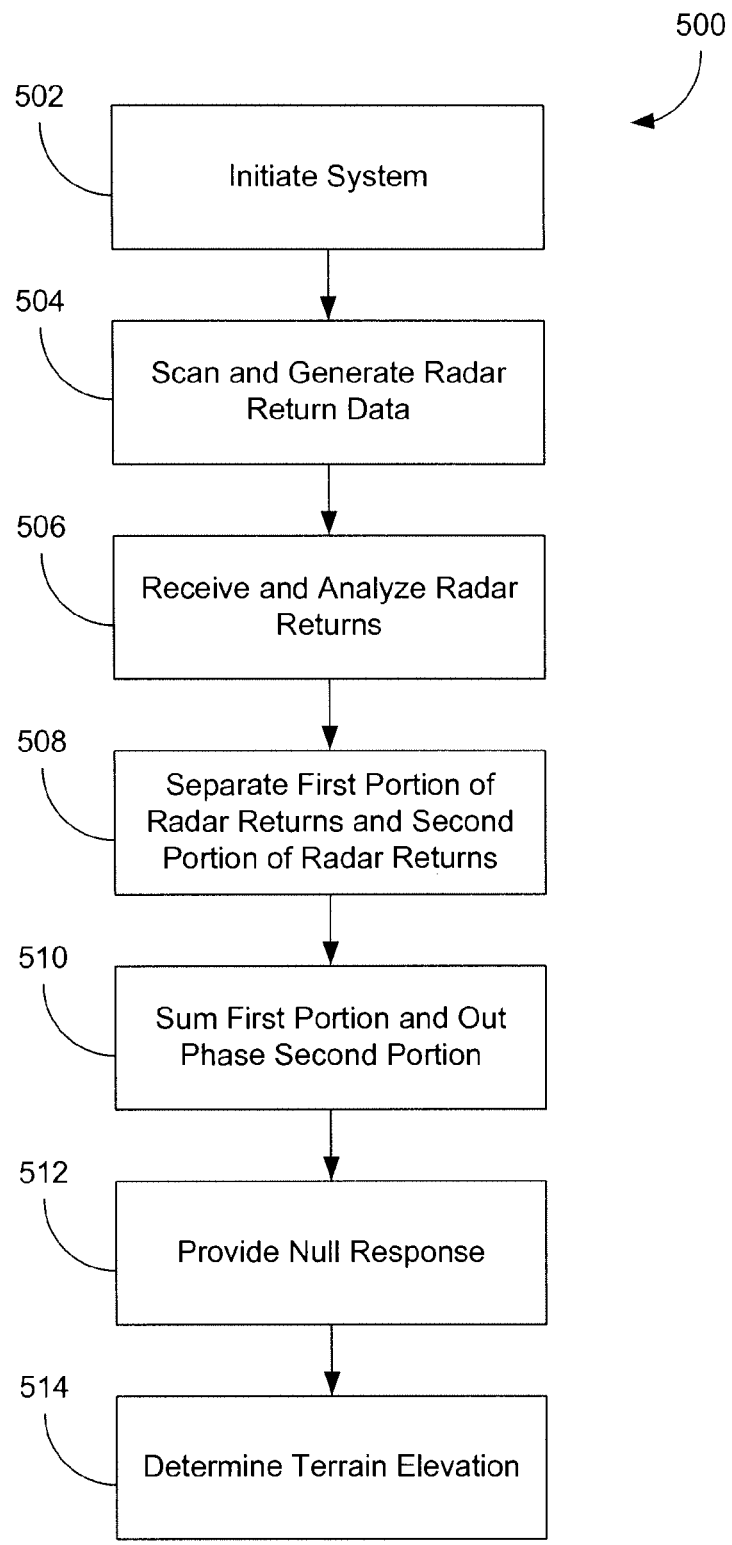
FIG. 5 is a flow chart of a method of sensing elevation of terrain using an airborne weather radar, according to an exemplary embodiment.

Referring to FIG. 5, a flow diagram of a method of sensing elevation of terrain using an airborne weather radar 500 is shown, according to an exemplary embodiment. The first step is to initiate the system (step 502). The initialization of the system may be triggered by pilot request or the aircraft may automatically generate the initialization of the system. Once the system is initialized, a radar, such as a weather radar, scans an area and generates radar return data (step 504). The radar return data may provide data about weather conditions, terrain, obstacles, or any combination thereof. A radar system, such as a weather radar system, then receives and analyzes the radar return data from the radar (step 506). The returns may be analyzed for various purposes. For example, the returns may be analyzed to determine an angle and range to the terrain that the aircraft is at, according to an exemplary embodiment.

Once the radar return data is received, the radar return data may be divided into two separate portions (step 508). According to one exemplary embodiment, the radar return data may be split up into an upper half portion and a lower half portion. In other exemplary embodiments, the radar return data may be split up into a left half portion and a right half portion or any other method of splitting the radar return data into two portions may be implemented. According to yet other exemplary embodiments, the radar return data may be split up into more than two portions.

Once the radar return data has been portioned, the weather radar system sums the first portion with an out of phase second portion (step 510), according to an exemplary embodiment. In other exemplary embodiments, the radar system may sum an out of phase first portion with an out of phase second portion, or may sum multiple portions that are either in phase or out of phase. The radar system may also choose to perform other functions (e.g. multiplication, division, subtraction) on the various portions.

The summation of the various portions then provides a null response (step 512). The null response may be designed to provide greater resolution of terrain with respect to weather, according to an exemplary embodiment. The null response may be varied by how the various portions of the radar scan are altered. In an exemplary embodiment, a first portion summed with an out of phase second portion may provide a desired null response. In another exemplary embodiment, an out of phase first portion may be summed with an out of phase second portion to provide another desired null response.

According to one exemplary embodiment, the null response may be between 0.02 degrees and 0.05 degrees. According to other exemplary embodiments, the null response may be between 0.01 degrees and 0.10 degrees. The null response may also be normal to the antenna, according to another exemplary embodiment. It should be apparent to those skilled in the art that the null response may be altered in a plurality of ways to produce a desirable and useful result for a particular situation.

The null response is used to determine terrain elevation (step 514). The terrain elevation may be displayed on flight displays for pilot/copilot use. A response of a maximum followed by a minimum followed by a maximum is an indication of the presence of terrain. Alternatively, the presence of a less precipitous minimum is an indication of a lack of terrain or a response due to the presence of weather conditions. A filtering technique, such as a comb filter, can be used to determine when the null response indicates terrain.

Figure 6:
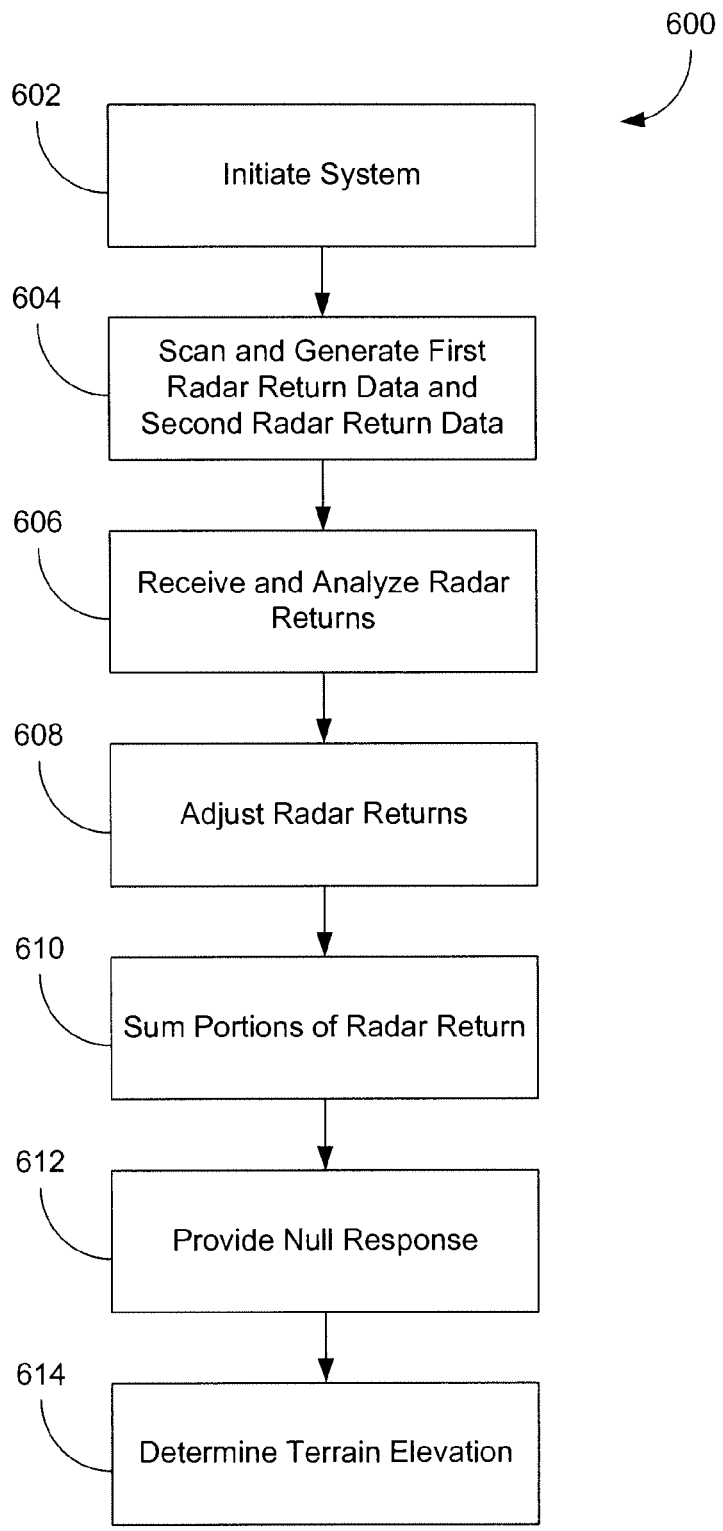
FIG. 6 is a flow chart of a method of sensing elevation of terrain using an airborne weather radar, according to another exemplary embodiment.

Referring to FIG. 6, a flow diagram of a method of sensing elevation of terrain using an airborne weather radar 600 is shown, according to another exemplary embodiment. The first step is to initiate the system (step 602). The initialization of the system may be triggered by pilot request or the aircraft may automatically generate the initialization of the system. Once the system is initialized, a radar, such as a weather radar, scans an area and generates a first radar return data and a second radar return data (step 604). The radar return data may provide data about weather conditions, terrain, obstacles, or any combination thereof. The radar may divide the radar return data in a variety of ways. In one exemplary embodiment, a weather radar antenna may be configured to use one portion to return a first radar return data and a second portion to return a second radar return data. A first portion of radar return data and second portion of radar return data may represent a lower half, an upper half, a left half or a right half of an area. In other exemplary embodiments, the radar return data may be portioned into more than two portions in a variety of ways. In an exemplary embodiment, the first radar return data may be received by the weather radar system before the second radar return data. In other exemplary embodiments, the various radar return data may arrive in any order at the weather radar system, or all radar return data may arrive concurrently at the weather radar system.

A radar system, such as a weather radar system, then receives and analyzes the radar return data from the radar (step 606). For example, the returns may be analyzed to determine an angle the aircraft is with respect to the terrain. As another example, the returns may be analyzed to determine a distance the aircraft is with respect to the terrain.

Once the radar return data is received, the radar return data may be adjusted (step 608). For example, a tuning vector may be multiplied to portions of a radar return data. According to one exemplary embodiment, the radar return data may be multiplied to a steering vector. In another exemplary embodiment, the radar return data may be adjusted using a gradient process. The adjustments may be adaptively performed, according to an exemplary embodiment.

Once the radar return data has been portioned and adjusted, the radar system sums the portions of the radar return together (step 610), according to an exemplary embodiment. In an exemplary embodiment, the radar system may sum an out of phase first portion with an out of phase second portion, may sum an out of phase first portion with a second portion, or may sum multiple portions that are either in phase or out of phase.

The summation of the various portions provides a null response (step 612). The null response may be designed to provide greater resolution of terrain with respect to weather, according to an exemplary embodiment. The null response may be varied by how the various portions of the radar scan are altered. In an exemplary embodiment, a first portion summed with an out of phase second portion may provide a desired null response. In another exemplary embodiment, an out of phase first portion may be summed with an out of phase second portion to provide another desired null response. According to one exemplary embodiment, the null response may be between 0.02 and 0.05 degrees. According to other exemplary embodiments, the null response may be between 0.01 degrees and 0.10 degrees. The null response may also be normal to the antenna, according to another exemplary embodiment. The sharpening ratio associated with the null response may be greater than 5:1, according to an exemplary embodiment. According to another exemplary embodiment, the sharpening ration may be greater than 10:1. It should be apparent to those skilled in the art that the null response may be altered in a plurality of ways to produce a desirable and useful result for a particular situation.

The null response is used to determine terrain elevation (step 614). The terrain elevation may be displayed on flight displays for pilot/copilot use. A response of a maximum followed by a minimum followed by a maximum is an indication of the presence of terrain. Alternatively, the presence of a less precipitous minimum is an indication of a lack of terrain or a response due to the presence of weather conditions.

Figure 7:
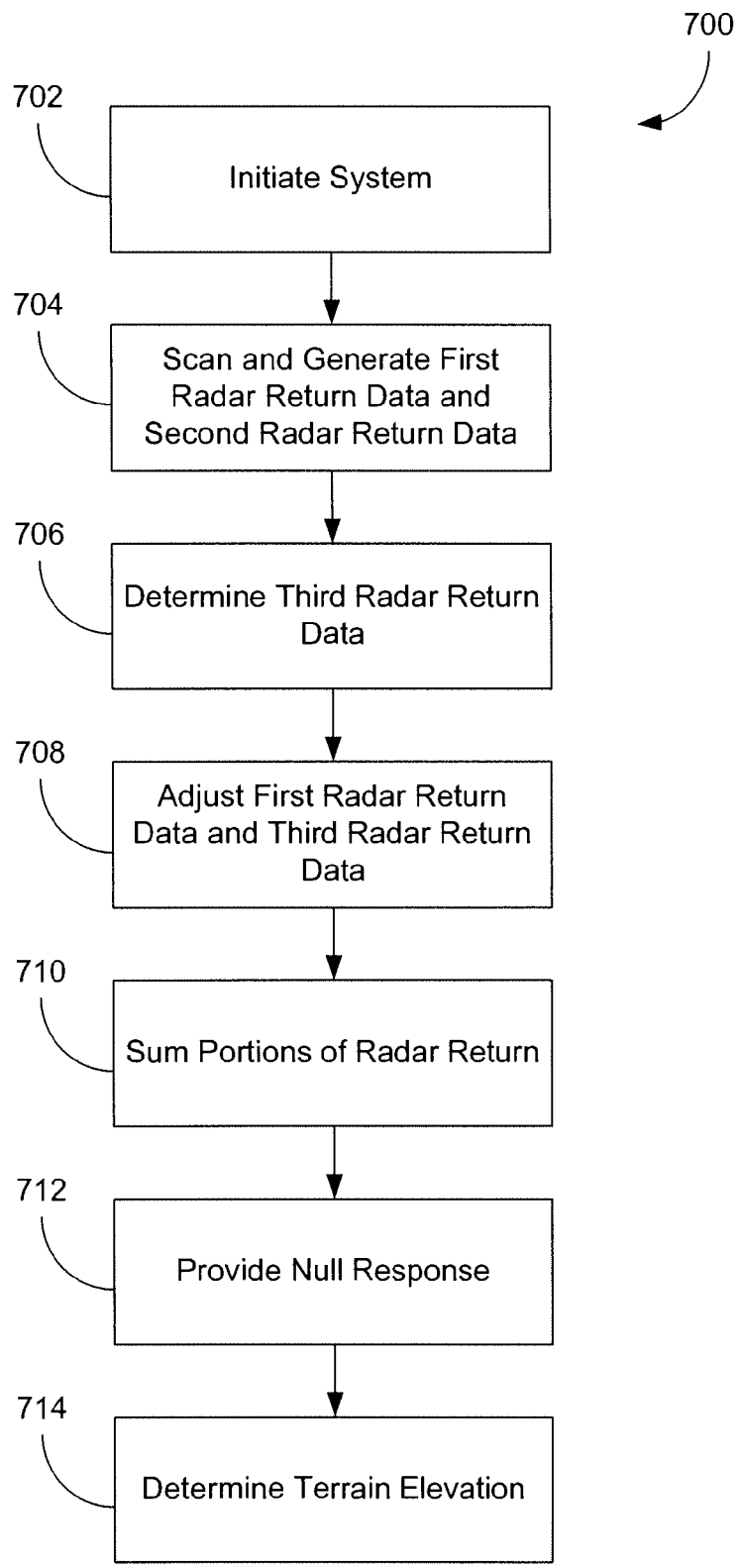
FIG. 7 is a flow chart of a method of sensing elevation of terrain using an airborne weather radar, according to yet another exemplary embodiment.

Referring to FIG. 7, a flow diagram of a method of sensing elevation of terrain using an airborne weather radar 700 is shown, according to yet another exemplary embodiment. The first step is to initiate the system (step 702). The initialization of the system may be triggered by pilot request or the aircraft may automatically generate the initialization of the system. Once the system is initialized, a radar, such as a weather radar, scans an area and generates a first radar return data and a second radar return data (step 704). The radar return data may provide data about weather conditions, terrain, obstacles, or any combination thereof. The radar may divide the radar return data in a variety of ways. In one exemplary embodiment, a weather radar antenna may be configured to use one portion to return a first radar return data and a second portion to return radar return data representing an entire area. A first portion of radar return data may represent a lower half, upper half, left half, or right half of an area. A second portion of radar return data may represent an entire area. In an exemplary embodiment, the first radar return data may be received by the weather radar system before the second radar return data. In other exemplary embodiments, the various radar return data may arrive in any order at the weather radar system, or all radar return data may arrive concurrently at the weather radar system.

Third radar return data may be determined using the first radar return data and the second radar return data (step 706). For example, the first radar return data may represent an upper half of an area scanned and the second radar return data may represent an entire scanned area. The weather radar system may subtract the first radar return data from the second radar return data to produce a third radar return data that represents the lower half of an scanned area. The third radar return data may be created in other various ways, according to various exemplary embodiments.

Once the radar return data is received, the radar return data may be adjusted (step 708). For example, a vector may be multiplied to a radar return data or a radar return data portion. According to one exemplary embodiment, the radar return data may be multiplied to a steering vector. In another exemplary embodiment, the radar return data may be multiplied to a tuning vector.

As discussed above, a tuning vector may be used modify the null pointing angle. This also allows the null to continue to point to the same angle in vertical space even the antenna is moving vertically. This allows multiple samples of radar null at a given direction. Using multiple samples allow null estimates to be improved by either coherent or incoherent averaging methods.

The tuning vector may be used to correct for imprecisions between sub-aperture beams or to steer the null that is constructed from the multiple beams. Steering is important for more than just the integration argument. Applicant has found that the pulse/receive cycle may not line up for a given target, at the null. This can require the antenna speed to be slowed (or that the transmitter pulse frequency be increased) to make sure at least one pulse set would fall into the null. Thus the null can be steered or adjusted over the entire space, effecting the alignment of pulses with the null.

Once the radar return data has been portioned, the radar system sums the portions of the radar return together (step 710), according to an exemplary embodiment. In an exemplary embodiment, the radar system may sum an out of phase first portion with an out of phase third portion, may sum an out of phase first portion with a third portion, or may sum multiple portions that are either in phase or out of phase.

The summation of the various portions then provides a null response (step 712). The null response may be designed to provide greater resolution of terrain with respect to weather, according to an exemplary embodiment. The null response may be varied by how the various portions of the radar scan are altered. In an exemplary embodiment, a first portion summed with an out of phase third portion may provide a desired null response. In another exemplary embodiment, an out of phase first portion may be summed with an out of phase third portion to provide another desired null response. The sharpening ratio associated with the null response may be greater than 5:1, according to an exemplary embodiment. According to another exemplary embodiment, the sharpening ration may be greater than 10:1. The null response may be tunes for the best cancellation ratio between the first portion of the radar return data and the third portion of the radar return data. It should be apparent to those skilled in the art that the null response may be altered in a plurality of ways to produce a desirable and useful result for a particular situation.

The null response is used to determine terrain elevation (step 714). The terrain elevation may be displayed on flight displays for pilot/copilot use. A response of a maximum followed by a minimum followed by a maximum is an indication of the presence of terrain.

Figure 8:
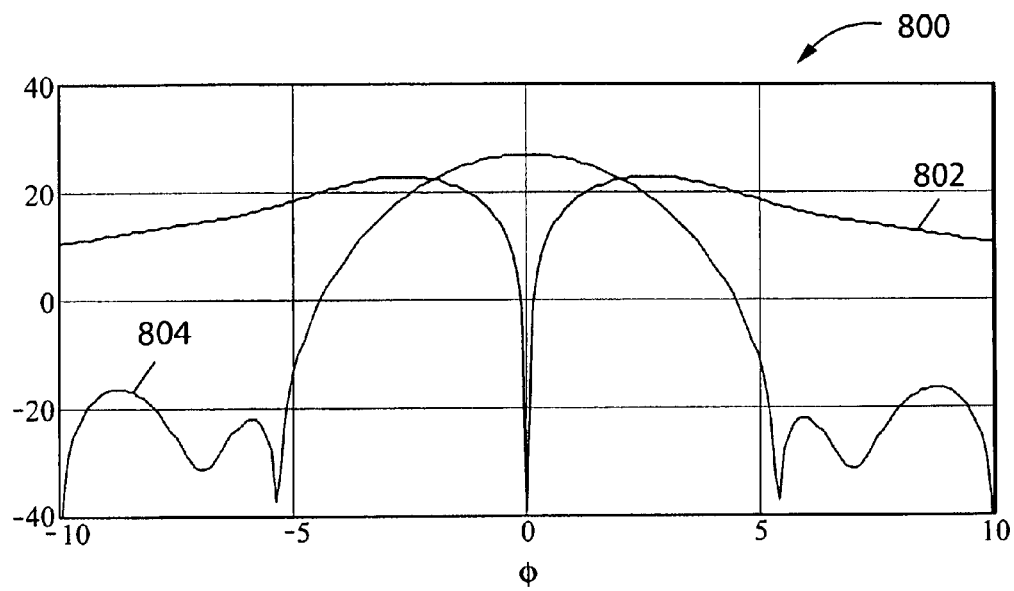
FIG. 8 is a representation of relative gain in dBi versus angle of a one-way sum beam response and a one-way difference beam response for an air-transport sized antenna according to another exemplary embodiment.

With reference to FIG. 8, a representation 800 includes plots for responses 802 and 804. Response 802 is a null response provided according to the processes described with reference to FIGS. 1-7. Response 804 is a sum response.

Response 804 is one way receive or transmit power sum response for which sub-apertures are added together. Response 804 is a one way receive or transmit response for which sub-apertures are added after a 180 degree phase adjustment (difference). Responses 802 and 804 are theoretical Hamming weighted aperture responses for an air transport sized antenna. The null depth of response 802 is limited by a 0.2 percent power mismatch between sub-apertures.

Figure 9:
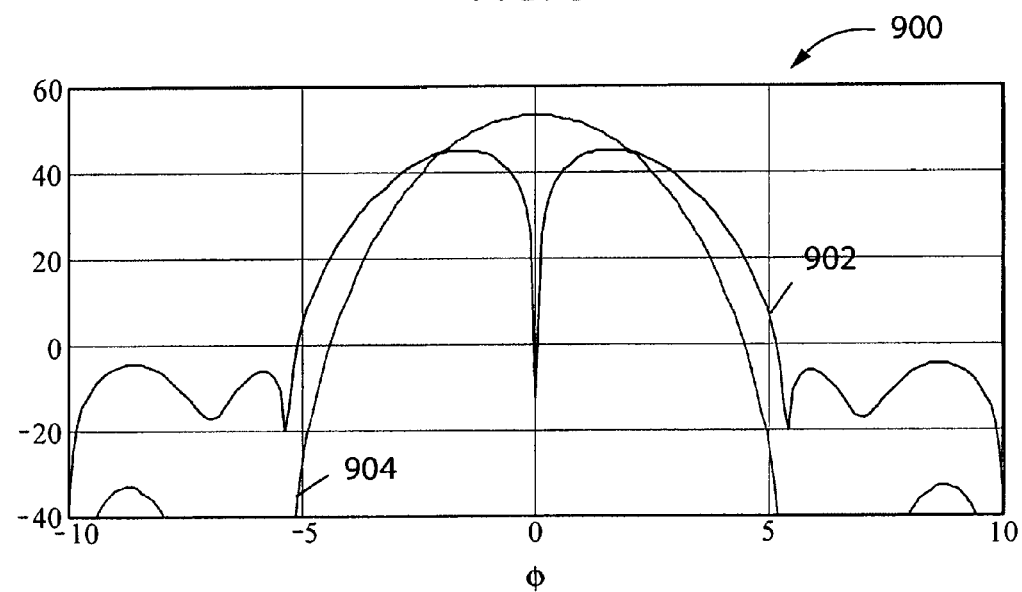
FIG. 9 is a representation of relative gain in dBi versus angle for a two-way sum beam response and a two-way difference beam response for an air-transport sized antenna according to another exemplary embodiment.

With reference to FIG. 9, a representation 900 includes plots for responses 902 and 904. Response 902 is a null response provided according to the processes described with reference to FIGS. 1-7. Response 904 is a sum response.

Response 904 is a two way receive and transmit power sum response for which sub-apertures are added together. Response 902 is a two way receive and transmit response for which sub-apertures are added after a 180 degree phase adjustment (difference). Responses 902 and 904 are theoretical Hamming weighted aperture responses for an air transport sized antenna. The null depth of response 902 is limited by a 0.2 power mismatch between sub-apertures.

Figure 10:
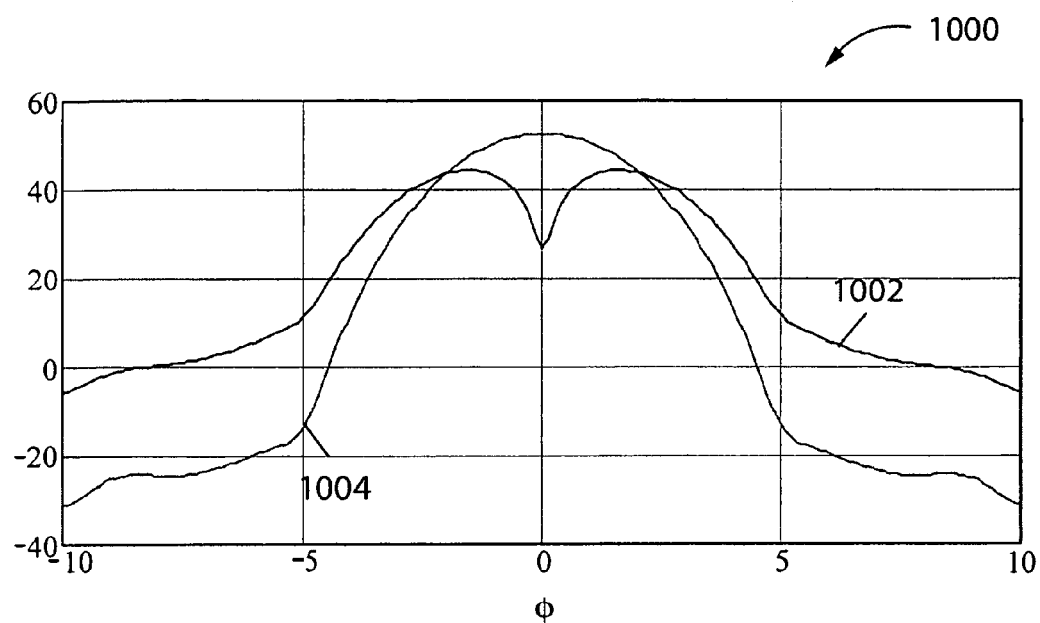
FIG. 10 is a representation of relative gain in dBi versus angle of a two-way sum beam response and a two-way difference beam response for an air-transport sized antenna having a 1 dB gain mismatch according to another exemplary embodiment.

With reference to FIG. 10, a representation 1000 is similar to representation 900 and includes plots for responses 1002 and 1004. Response 1002 is a null response provided according to the processes described with reference to FIGS. 1-7. Response 1004 is a sum response.

Response 1004 is a two way receive and transmit power sum response for which sub-apertures are added together. Response 1002 is a two way receive and transmit response for which sub-apertures are added after a 180 degree phase adjustment (difference). Responses 1002 and 1004 are theoretical Hamming weighted aperture responses for an air transport sized antenna and have a 1 dB gain mismatch between sub-apertures (e.g., half apertures).

Figure 11:
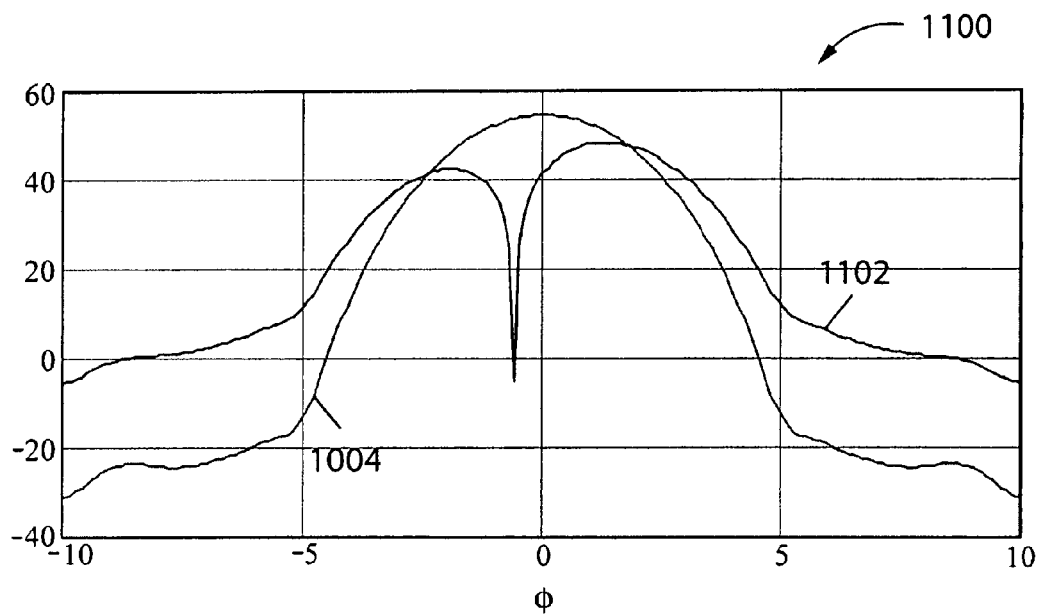
FIG. 11 is a is a representation of relative gain in dBi versus angle of a two-way sum beam response and a two-way difference beam response for an air-transport sized antenna utilizing null steering according to another exemplary embodiment.

With reference to FIG. 11, a representation 1100 includes plots for responses 1102 and 1104. Response 1102 is a null response including null steering and is provided according to the processes described with reference to FIGS. 1-7. Response 1104 is a sum response.

Response 1104 is a two way receive and transmit power sum responses for which sub-apertures are added together. Response 1102 is a two way receive and transmit response for which sub-apertures are added after a 180 degree phase adjustment (difference). Responses 1102 and 1104 are theoretical Hamming weighted aperture responses for an air transport sized antenna. Response 1104 is null steered by changing the phase of one receive sub-aperture by approximately 27 degrees, thereby resulting in a negative 0.6 degree null pointing change.

Figure 12:
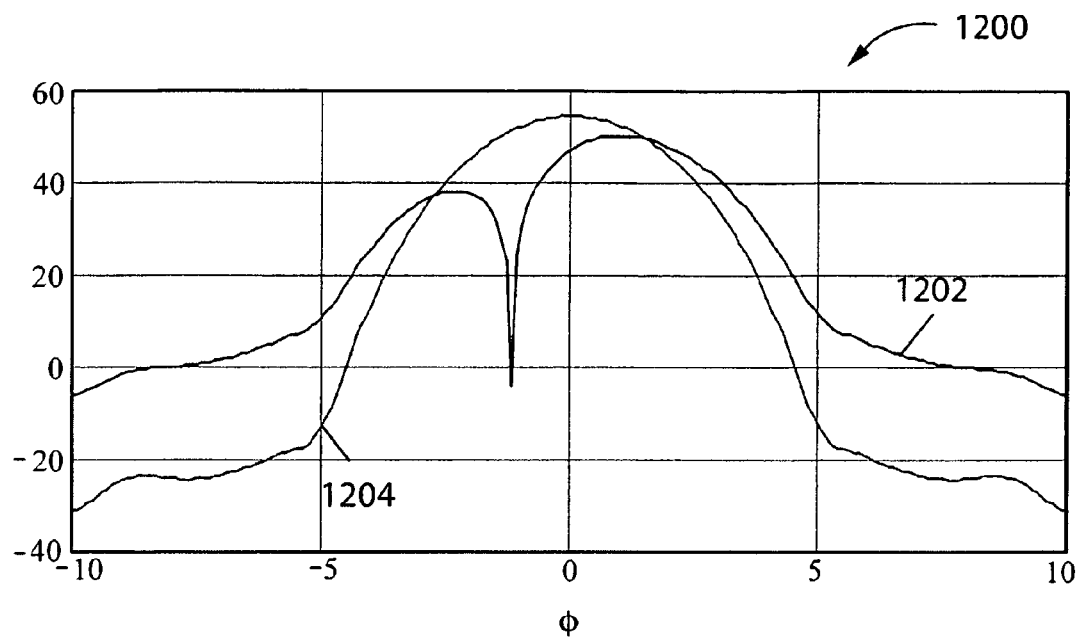
FIG. 12 is a is a representation of relative gain in dBi versus angle of a two-way sum beam response and a two-way difference beam response for an air-transport sized antenna utilizing null steering according to another exemplary embodiment.

With reference to FIG. 12, a representation 1200 includes plots for responses 1202 and 1204. Response 1202 including null steering and is a response provided according to the processes described with reference to FIGS. 1-7 and response 1204 is a sum response.

Response 1204 is a two way receive and transmit power sum response for which sub-apertures are added together. Response 1204 is a two way receive and transmit response for which sub-apertures are added after a 180 degree phase adjustment (difference). Responses 1202 and 1204 are theoretical Hamming weighted aperture responses for an air transport sized antenna. Response 1204 is null steered by changing the phase of one receive sub-aperture by approximately 64 degrees to achieve an approximately negative 1.2 degree null pointing change.

Figure 13:
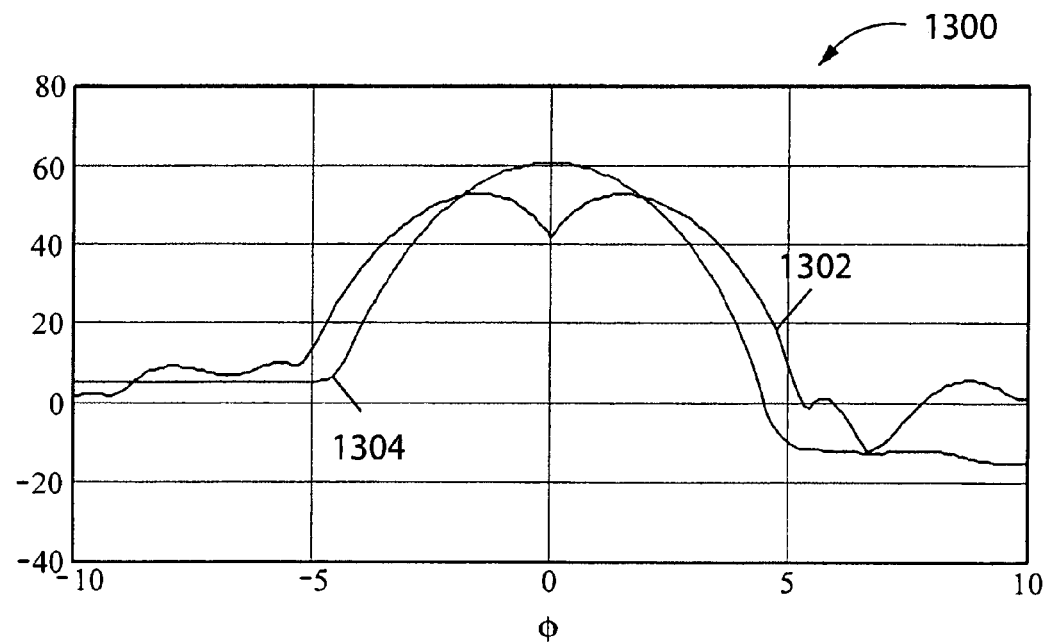
FIG. 13 is a representation of relative gain in dBi verses angle of a two-way sum beam response pointed at ground at a zero degree angle and a null two-way difference beam response in a weather environment pointed at ground at a zero degree angle according to another exemplary embodiment.

With reference to FIG. 13, a representation 1300 includes plots for responses 1302 and 1304. Response 1302 is a null response provided according to the processes described with reference to FIGS. 1-7. Response 1204 is a sum response.

Response 1304 is a two way receive and transmit power sum response for which sub-apertures are added together. Response 1304 is a two way receive and transmit response for which sub-apertures are added after a 180 degree phase adjustment (difference). Responses 1302 and 1304 are theoretical Hamming weighted aperture responses for an air transport sized antenna in an environment including 40 dBz rain intermixed with light ground clutter (e.g., a −27 dB sigma ratio) at a 10 nautical mile range. The aircraft is located on the ground with a 0 degree phi angle pointing along ground. The slope of response 1302 is zero at 0 degrees and the slope of response 1304 is approximately ½ dB for ½ degree change as the absolute value of the angle increases. In contrast, the slope of response 1304 is greater than the slope of response 1302 and therefore easier to detect. Response 1304 has a slope of 6.5 dB change over ½ degree associated with the null.

The transmit and receive patterns for the different responses of FIGS. 8-13 can be exchanged if desired. For example, instead of transmitting on sum and receiving on difference, the transmit could be on difference while the receive is on sum. The entire response would remain the same or similar. The x axis of representations 800 and 900, 1000, 1100, 1200, and 1300 represents angle and the y axis of representations 800, 900, 1000, 1100, 1200 and 1300 represents gain (dBi).

Although specific steps are shown and described in a specific order, it is understood that the method may include more, fewer, different, and/or a different ordering of the steps to perform the function described herein. Flow diagrams 500, 600, and 700 can be implemented in software on a computing platform associated with a weather radar system, a TAS, or other aviation device. Preferably, diagrams 500, 600, and 700 are implemented on a weather radar computing platform such as an RDR 40000 or WXR-2100 multiple system.

The exemplary embodiments and representations illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the radar system as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

What is claimed is:

1. A method of sensing elevation of terrain using an airborne weather radar, the method comprising:
   sweeping a radar beam at least partially vertically with the airborne weather radar;
   obtaining radar returns relating to the radar beam at an antenna associated with the airborne weather radar;
   sampling first radar returns of the radar returns from a first portion of an antenna;
   sampling second radar returns of the radar returns from a second portion of the antenna;
   adjusting at least one of phase and power of at least one of the first radar returns and the second radar returns and combining the first radar returns and the second radar returns to provide a null response; and
   analyzing changes in the null response as the radar beam is swept at least partially vertically to sense elevation of the terrain.

2. The method of claim 1 wherein radar returns near the null response are used in the sensing of the elevation of the terrain.

3. The method of claim 2 whereby the adjusting operates to tune the null response according to a target cancellation ratio between a first beam associated with the first radar returns and a second beam associated with the second radar returns.

4. The method of claim 1 wherein the adjusting is adaptively performed.

5. The method of claim 1 wherein the first radar returns are received by a first receiver and the second radar returns are received by a second receiver.

6. The method of claim 1 wherein the first radar returns are received before the second radar returns.

7. The method of claim 1 wherein the adjusting uses a tuning vector.

8. The method of claim 1 wherein the adjusting uses a steering vector.

9. A weather radar system coupled to a weather radar antenna, the weather radar system comprising:
   a receive circuit for receiving radar returns received by the antenna and providing radar return data; and
   a processor coupled to the receive circuit and receiving the radar return data, the processor summing portions of the radar return data to obtain a null response, the processor adjusting at least one of phase and power of at least one portion of the radar return data, wherein the adjusting includes using at least one of a steering vector and a tuning vector.

10. The weather radar system of claim 9 wherein the power of the at least one portion of the radar return data is representative of power received by the weather radar antenna scanning in at least one direction.

11. The weather radar system of claim 9 wherein the null response is achieved by multiplying at least one of a steering vector and a tuning vector by a first portion or a second portion of the radar return data.

12. The weather radar system of claim 11 wherein the processor performs a gradient process when the processor adjusts the phase or power.

13. The weather radar system of claim 12 wherein a sharpening ratio associated with the null response is greater than 5:1.

14. The weather radar system of claim 11 wherein the receive circuit includes a first receive circuit for the first portion and a second receive circuit for the second portion.

15. The weather radar system of claim 9 wherein the radar return data is used for sensing weather.

16. The weather radar system of claim 9 wherein the null response is used to sense terrain.

17. An apparatus for sensing terrain height, the apparatus comprising:
   means for sampling weather radar return data associated with a scan and providing a first portion of radar return data and a second portion of the weather radar data; and
   means for providing a null response in response to the first portion and the second portion, whereby the null response is provided by summing the first portion with the second portion after the first portion or the second portion has been adjusted in at least one of phase and power to tune for a well formed null pattern; and
   means for analyzing changes in the null response to sense the terrain height.

18. The apparatus of claim 17, wherein the adjusting is accomplished by multiplying by a tuning vector.

19. The apparatus of claim 18, wherein the null response is steered by multiplying by a steering vector.

20. The apparatus of claim 17 wherein the first and second portions are associated with different antenna halves.

* * * * *